(12) United States Patent
Mejia

(10) Patent No.: US 6,625,241 B2
(45) Date of Patent: *Sep. 23, 2003

(54) DATA COMMUNICATIONS BIT STREAM COMBINER/DECOMBINER

(75) Inventor: Robert G. Mejia, Boise, ID (US)

(73) Assignee: Hewlett-Packard Development Company, L.P., Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/352,491

(22) Filed: Jul. 13, 1999

(65) Prior Publication Data

US 2002/0176526 A1 Nov. 28, 2002

(51) Int. Cl.[7] .................................................. H04B 7/00
(52) U.S. Cl. ...................................... 375/372; 375/363
(58) Field of Search ................................. 375/372, 354, 375/363, 365, 368, 377

(56) References Cited

U.S. PATENT DOCUMENTS 3,873,773 A  * 3/1975 Guy, Jr. ........................ 370/505
5,438,590 A  * 8/1995 Tzukerman et al. ........ 375/259
6,289,066 B1 * 9/2001 LaVigne et al. ............. 375/372
6,339,621 B1 * 1/2002 Cojocaru et al. ........... 375/247

* cited by examiner

Primary Examiner—Chi Pham
Assistant Examiner—Kevin M Burd

(57) ABSTRACT

A method and apparatus for multiplexing and demultiplexing multiple serial data streams provide double the data throughput on a single media channel, such as Fibre Channel (EC). A first incoming data stream is routed to a first synchronizer unit, which receives a 0-degree phase signal of a local clock operating at the same basic frequency as that of the incoming data. The first synchronizer unit establishes and maintains synchronization of the first data stream with the 0-degree phase signal. A second incoming data stream is routed to a second synchronizer unit, which receives a 180-degree phase signal of the local clock. The second synchronizer unit establishes and maintains synchronization of the second data stream with the 180-degree phase signal. The synchronizer units maintain synchronization of the respective data streams by applying an elasticity function to the data streams. After synchronization to the local clock, the two resultant data streams are multiplexed by an interleaver at double the baud rate. Bits are taken alternately from the two resultant data streams, resulting in an output data stream containing all of the bits from both resultant data streams and all of the data bits from both input data streams. Even numbered bits in the combined stream originate from one resultant data stream, while the odd numbered bits originate from the other.

25 Claims, 6 Drawing Sheets

DATA COMMUNICATIONS BIT STREAM COMBINER/DECOMBINER

FIELD OF THE INVENTION

This invention relates to techniques for the transmitting serial data over a transmission medium. It also relates to methods for transmitting multiple bit streams on a single transmission medium. It further relates to Fibre Channel communications and communications protocol.

BACKGROUND OF THE INVENTION

The Fibre Channel (FC) standard provides a general transport vehicle for Upper Level Protocols such as Intelligent Peripheral Interface (IPI) and Small Computer System Interface (SCSI) command sets, the High-Performance Parallel Interface (HIPPI) data framing, IP (Internet Protocol), IEEE 802.2, and others. Proprietary and other command sets may also use and share Fibre Channel, but such use is not defined as part of the Fibre Channel standard. Logically, the Fibre Channel is a bidirectional point-to-point serial data channel, structured for high-performance capability. Physically, the Fibre Channel can be an interconnection of multiple communication points, called N_Ports, interconnected by a switching network, called a fabric, an arbitrated loop, or a point-to-point link. The word fibre is a general term used to cover all physical media types supported by the Fibre Channel, such as optical fiber, twisted pair, and coaxial cable.

The Fibre Channel standard specifies only a serial bit stream for transmission. Transfers between nodes over Fibre Channel occur between buffers. Information stored in a buffer (generally constructed from RAM) at a first node is sent from a transmitting port associated with that node, across a physical medium (i.e., the Fibre Channel), to a receiving port at a second node, and stored in a buffer at the second node. The basic unit of transfer for the contents of a buffer between two ports is the frame. A frame consists of a start-of-frame (SOF) word, a multi-word header, multiple data words, a cyclic redundancy check (CRC) word, and an end-of-frame (EOF) word.

Fibre Channel is structured as a set of hierarchical functions, each of which is described as a level. The lowest level, FC-0 (physical), has two components: interface and media. The media component defines the fibre, connectors and optical and electrical parameters for a variety of data rates. Coax and twisted pair versions are defined for limited distance applications. The interface component consists of transmitters, and receivers and their interfaces. The next level, FC-1 (transmission code and protocol), defines the transmission protocol which includes the serial encoding, decoding and error control. Level FC-2 (signaling protocol), which sits atop level FC-1, defines the signaling protocol which includes the frame structure and byte sequences. The next level, FC-3 (common services), defines a set of services which are common across multiple ports of a node. The highest level in the Fibre Channel standards set, FC-4 (mapping), defines the mapping between the lower levels of the Fibre Channel and the IPI and SCSI command sets, the HIPPI data framing, IP and other Upper Level Protocols (ULPs).

A buffer can be thought of as an ordered set of bytes numbered from 0 to n. Neither the actual length of a buffer nor the technology used to store the bytes are defined by the Fibre Channel standard. Stored bytes are transmitted in the order of increasing displacement (i.e., from low address to high address), starting with the first.

Fibre Channel does not provide for error correction of transmitted information. Instead, it relies solely on error detection and retransmission of inaccurately received information. Consequently, information stored in the buffer at the first node is not overwritten until it is determined that the information was accurately stored in the second node. The observed bit error rate (BER) over optical media seems to be about 1 error in 10E16 to 10E24 bits, which is well within the maximum 1E12 requirement of the Fibre Channel specification. With a BER of 1 error in 10E16 bits, and a Fibre Channel standard transmission rate of 1.0625 gigabaud/second, one error is expected on a single fibre of a link about once during each 1089 days. In order to provide for both the ordered sending of information bytes over the Fibre Channel and for the detection of errors, transmitted information bytes are encoded. Fibre Channel transmits information using an adaptive 8B/10B code. Code rules require that each 8-bit byte of data be transformed into a 10-bit Data Transmission Character. Two types of Transmission Characters are defined: Data and Special. The Special Transmission Characters are used to specify the maximum run length of a transmission and to provide word alignment.

The 8B/10B encoding scheme in Fibre Channel utilizes "running disparity" to detect most errors in received transmission characters. Cyclic redundancy checks (CRC) are used to detect errors which are undetected by running disparity. Running disparity is a requirement that the transmission code have a balance of ones and zeros over short periods of time. This requirement of balance necessitates a special encoding and decoding procedure. Some data bytes encode to transmission characters that have more ones than zeros; others have more zeros than ones; and still others have an equal number of ones and zeros. If a string of bytes were to encode to transmission characters where each transmission character has more ones than zeros, the transmission stream would quickly become unbalanced, resulting in the detection of an error at the receiving node. The 8B/10B algorithm used by Fibre Channel solves this problem by providing two encodings for each character having an unbalanced number of ones and zeros. For example, if a byte encodes to 011011 0101b, the first 6 bits are unbalanced, having 4 ones and 2 zeros. The complement, or alternate, encoding for the same data byte is 100100 0101b, which has 2 ones and 4 zeros in the first six bits. In order to maintain balance during transmission, each off-balance transmission character is always immediately followed by a character of opposite disparity. At the receiving node, the same balanced code rules apply to the decoding of transmission characters. It is illegal to decode a pattern of transmission characters that is unbalanced. Sixty-two percent of transmitted errors can be detected using the running disparity encoding scheme. Fibre Channel relies on CRC to detect the remaining thirty-eight percent.

The 8B/10B encoding scheme, in addition to facilitating the implementation of running disparity error detection, has the added advantage of maintaining transmission balance, whether it be light on/off balance for the loading of optical fiber or DC balance for the loading of AC-coupled copper media. Evenly-balanced code transmission facilitates receiver design.

The 8B/10B encoding scheme has only 390 valid patterns for transmission characters out of a total of 1024 possible patterns ($2^{10}$). The number 390 is derived as follows: 256 byte patterns times two variations equals 512. However, 134 encoded patterns are fully balanced, so no alternate pattern is needed: 512−134=378. These 378 transmission characters are called data characters, or D-characters, for short. There are also twelve special characters, called K-characters, which are used for control functions, bringing the total to 390.

A unit consisting of four characters transmitted as a unit is called a transmission word, a total of 4×10, or 40, bits. A transmission word is the smallest complete transmission unit in Fibre Channel. The first of the four transmission characters can be either an encoded byte or a special character. The remaining three transmission characters are encoded bytes. Information transferred across Fibre Channel is not always an even multiple of four bytes. Consequently, the framing protocol has a provision to add pad, or filler, bytes to frames before transmission between nodes. The pad bytes are stripped as part of the framing protocol at the receiving node.

Special characters are used for signaling functions. The 8B/10B encoding algorithm guarantees that no data byte can be validly encoded into one of the 10-bit special characters. One special pattern of seven bits, easily recognizable by hardware, is called the comma pattern. This special bit pattern has two bits of the same value followed by five of the opposite value. Neither of these binary values (i.e., 1100000 or 0011111) is a full transmission character. The comma is found in the first seven bits of three special characters. These special characters containing the comma are used to achieve both transmission character alignment and transmission word alignment at the receiving N_Port, among other things.

During the encoding process, each 8-bit data byte is split into two fields-one of 3 bits and one of 5 bits. For example, the hexadecimal byte value B6, or 1011 0110b is divided as follows: 101 10110b. Each new field is converted to a decimal (base 10) value: 5 and 22. The descriptive format for a data byte is of the form Dxx.y, where y=5 and xx=22. The data byte B6h, is thus described in the D-character format as D22.5. A similar technique is used to describe the twelve K-characters.

Certain combinations of Transmission Characters, referred to as Ordered Sets, are given special meaning by the Fibre Channel standard. There are special names for each type or ordered set: primitive signals; primitive sequences; and frame delimiters. Ordered sets mark boundaries in the stream of bits flowing across a link. They also have special meanings that cannot be transmitted using encoded data bytes. For example, a destination N_Port must be able to detect the beginning and end of frames. The port must be able to locate the transmission words between frame delimiters. The primitive signal called Idle indicates that no useful information is being transmitted on a link. The signal merely indicates that the link is operational. The primitive signal called Receiver Ready, informs a sending node that buffer space has been freed up in the receiving node, and that another frame may be sent. Flow control makes extensive use of this signal. The Arbitrated Loop topology for Fibre Channel utilizes additional primitive signals and primitive sequences which are defined by Fibre Channel's Arbitrated Loop topology standard.

A primitive sequence is a single transmission word sent repeatedly until a proper response is received. Primitive sequences are used to signal specific conditions (e.g., Online, Offline, Not_Operational, Link_Reset, and Link_Resent_Response)) associated with one port to another port. Because of the importance of primitive sequences, special rules have been formulated for sending and receiving them. For example, Fibre Channel requires that the receiving port validate the primitive sequence by detecting three identical transmission words in succession.

Frame delimiters, which are used to indicate the beginning and end of frames, are treated much like primitive signals even though they are not identified as such. However, only one transmission word is required to detect each frame delimiter.

Communication links always have a limited number of channels. Thus, information flow can be increased in only two ways: by increasing the flow rate of information, or by increasing the number of available channels. Generally speaking, it is more economical to increase the flow rate than it is to add channels. What is needed is a method for multiplexing multiple serial data streams so that both can be sent on a single Fibre Channel.

SUMMARY OF THE INVENTION

The present invention provides a method and apparatus for multiplexing and demultiplexing multiple serial data streams so that both can be sent simultaneously on a single Fibre Channel. Fibre Channel (FC), as do most other data communications systems, relies on an embedded clock to synchronize transmitted serial data streams. As FC utilizes multiple transmission frequencies which are interrelated by a power of two (e.g., 531.25 megabaud; 1.0625 gigabaud; 2012.5 gigabaud; 4025 gigabaud; etc.), the invention makes use of this relationship in the multiplexing process by combining $2^n$ (where n=1, 2, 3, . . . ) serial data streams into a single data stream of a higher related frequency. By multiplexing multiple data streams into one, the multiplexed data may be transmitted over a single medium. For long-distance applications, where the number of connections, or channels, is limited by cost factors, data transmission costs will be reduced by increasing data flow through the available channels.

The new multiplexing method will be described with respect to the multiplexing of first and second serial data streams. Though they are being received at one of the standard FC frequencies, they cannot be considered synchronous with respect to either a local clock signal or one another. Even slight asynchronousness, whether measured in the form of slight frequency differences or as phase change rate differences greatly increases the difficulty of multiplexing the two data streams. If the two data streams are not synchronous with respect to each other, data overruns and underruns may well result, thereby compromising data reliability.

The multiplexing process is implemented by having a local clock provide both 0-degree phase and 180-degree phase signals of a clock signal at the same basic frequency as that of the incoming data, as well as a double-frequency clock signal, which maintains phase with both the 0-degree phase and 180-degree phase signals. The first incoming data stream is routed to a first synchronizer unit, which receives the 0-degree phase signal of the local clock. The first synchronizer unit establishes and maintains synchronization of the first data stream with the 0-degree phase signal. The second incoming data stream, on the other hand, is routed to a second synchronizer unit, which receives the 180-degree phase signal of the local clock. The second synchronizer unit establishes and maintains synchronization of the second data stream with the 180-degree phase signal. The synchronizer units maintain synchronization of the respective data streams by applying an elasticity function to the data streams. After synchronization to the local clock, the two resultant data streams are multiplexed by an interleaver at double the baud rate. Bits are taken alternately from the two resultant data streams, resulting in an output data stream containing all of the bits from both resultant data streams and all of the data bits from both input data streams. Even numbered bits in the combined stream originate from one resultant data stream, while the odd numbered bits originate from the other.

Each synchronizer unit includes a receiver for receiving one of the data streams; a buffer for storing a portion of the received data stream; overfill/underfill detection logic for determining when the buffer is less than optimally filled and when it is more than optimally filled; format detection logic for detecting start-of-frame and end-of-frame transmission words and fill words between frames; a retimer for adding or deleting 40-bit fill words, as needed, between frames; a transmitter for synchronizing and transmitting the reformatted data stream to the interleaver; and a state machine for receiving either the 0°-phase signal or the 180°-phase signal from the local clock, signals from the overfill/underfill detection logic and the format detection logic, and controlling the reformatter and transmitter in response to the received signals. Before any data is sent to the retimer, the buffer is allowed to partially fill. However, it is never allowed to fill completely, thereby providing slack for data streams of slightly mismatched frequency on either the high side or low side of the local clock frequency. The re-timer maintains coarse synchronization by adding or deleting fill words from the data stream, while the transmitter is responsible for maintaining precise synchronization of the signal in response to control from the state machine and the local clock signal.

In order to tag one of two combined bit streams, an easily-identifiable, special fill word having a pattern which does not occur in normal Fibre Channel traffic is substituted for an unnecessary fill word at the beginning of the stream, as well as periodically thereafter. Such a fill word is a 40-bit alternating k28.5 pattern (0011111010110000010100111110101100000101). Substitution of the alternating k28.5 fill word for an unnecessary fill word may be effected only when the unnecessary fill word occurs at least twice in a row.

At the end of the link, it is necessary to separate the combined bit streams into separate bit streams. This is accomplished by applying a phase locked loop to the received data and generating two clock signals at one half of the incoming baud rate. Each of the generated clock signals is used to clock one of the separated bit streams. A pattern detector, which synchronizes to comma characters, scans the incoming multiplexed data for fill word pairs of which the second word is the k28.5 pattern. The detector maintains the last received fill word in memory. An output router is toggleable so that incoming bits may be routed to one of two outputs. When an alternating k28.5 pattern is recognized by the pattern detector, an output router is toggled so that the alternating bits belonging to that pattern, as well as all subsequent alternating bits of the bit stream so tagged, are routed to the appropriate output. The pattern detector replaces the alternating k28.5 word with a copy of the fill word that was received immediately prior to the reception of the alternating k28.5 pattern. The alternating bits of the untagged bit stream are routed the other output receiver. The bits fed to the two receivers constitute reconstructions of the original two data streams.

DETAILED DESCRIPTION OF THE INVENTION

The apparatus and method for multiplexing multiple serial data streams into a single serial data stream of double the frequency will now be described in detail with reference to the accompanying drawings.

Figure 1:
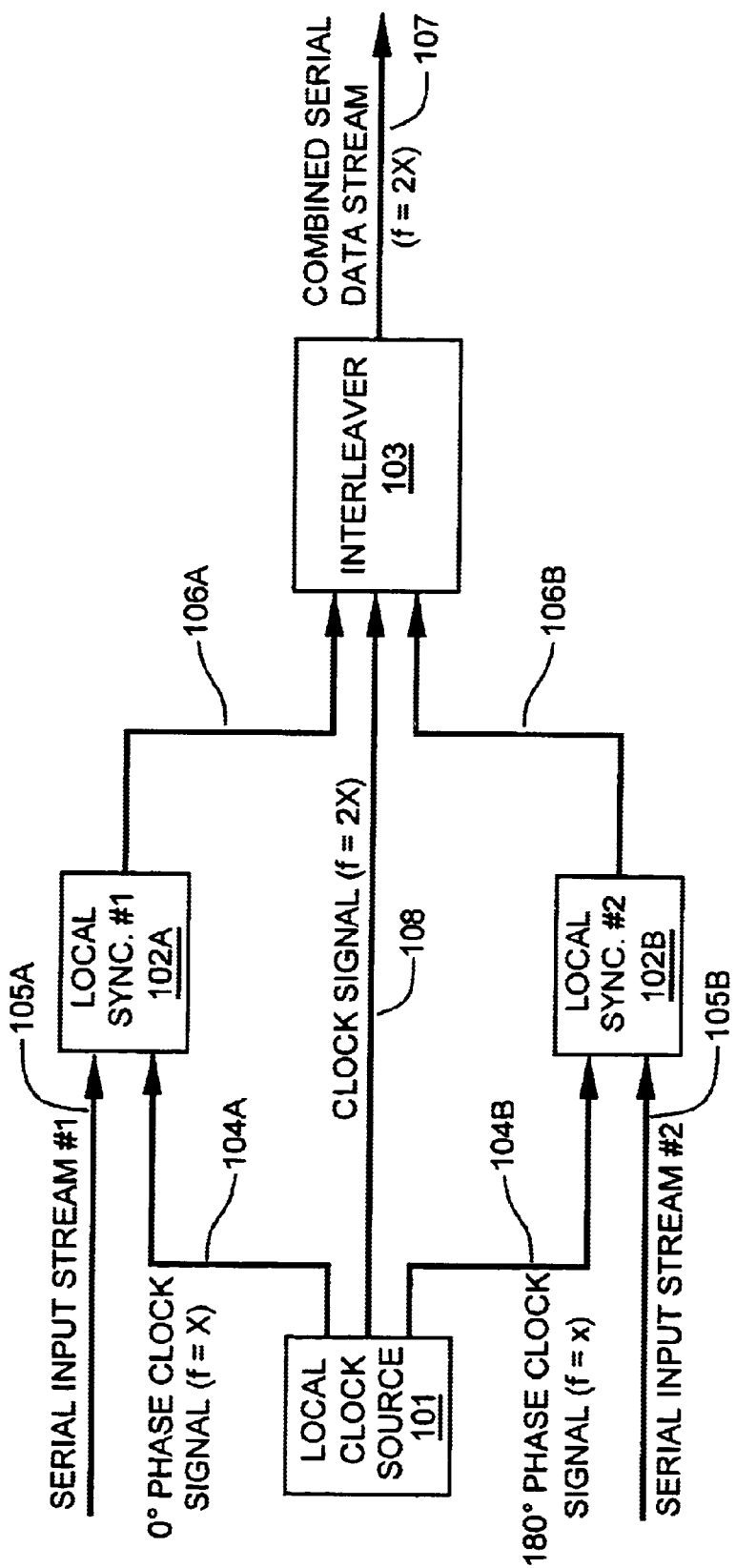
FIG. 1 is a block diagram of a double bitstream multiplexer.

Referring now to FIG. 1, it is desired to multiplex a pair of serial data streams 105A and 105B. Though they are being received at a baud rate that is nominally the same as one of the standard FC frequencies, they cannot be considered perfectly synchronous with respect to a signal from the local clock source 101 or with respect to one another. Even slight asynchronousness, whether it be in the form of slight frequency differences or phase differences, greatly increases the difficulty of multiplexing the two data streams. If the two data streams are not synchronous with respect to each other, simple multiplexing will likely result in slivered or overlapped pulses, as well as data overruns or underruns, thereby compromising data reliability.

Still referring to FIG. 1, the multiplexing apparatus comprises a local clock source 101 having a fundamental frequency that is nominally the same as the baud rate of each of the data streams 105A and 105B, a first local synchronizer unit 102A, a second local synchronizer unit 102B, and an interleaver 103. The local clock source 101 outputs both a zero-degree-phase signal 104A and a one-hundred-eighty-degree-phase signal 104B at the fundamental frequency. The 0°-phase signal 104A and a first serial data stream 105A are received by the first local synchronizer unit 102A, while the 180°-phase signal and a second serial data stream 105B are received by the second local synchronizer unit 102B. The first local synchronizer unit 102A establishes and maintains synchronization of the first data stream A with the 0-degree phase signal, while the second local synchronizer unit 102B establishes and maintains synchronization of the second data stream B with the 180-degree phase signal. The local synchronizer units 102A and 102B maintain synchronization of the first and second serial data streams (105A and 105B, respectively) by applying an elasticity function to the data streams. After synchronization to opposite phases of the local clock source 101, the two resultant data streams 106A and 106B are multiplexed into a single combined serial data stream 107 by the interleaver 103 at double the baud rate. The interleaver 103 receives a double the fundamental frequency clock signal 108 from the local clock source 101. Bits are taken alternately from the two resultant data streams 106A and 106B, with the result that the combined output data stream 108 contains all of the bits from both resultant data streams 106A and 106B, with the even numbered bits coming from one resultant data stream and the odd numbered bits coming from the other.

Figure 2:
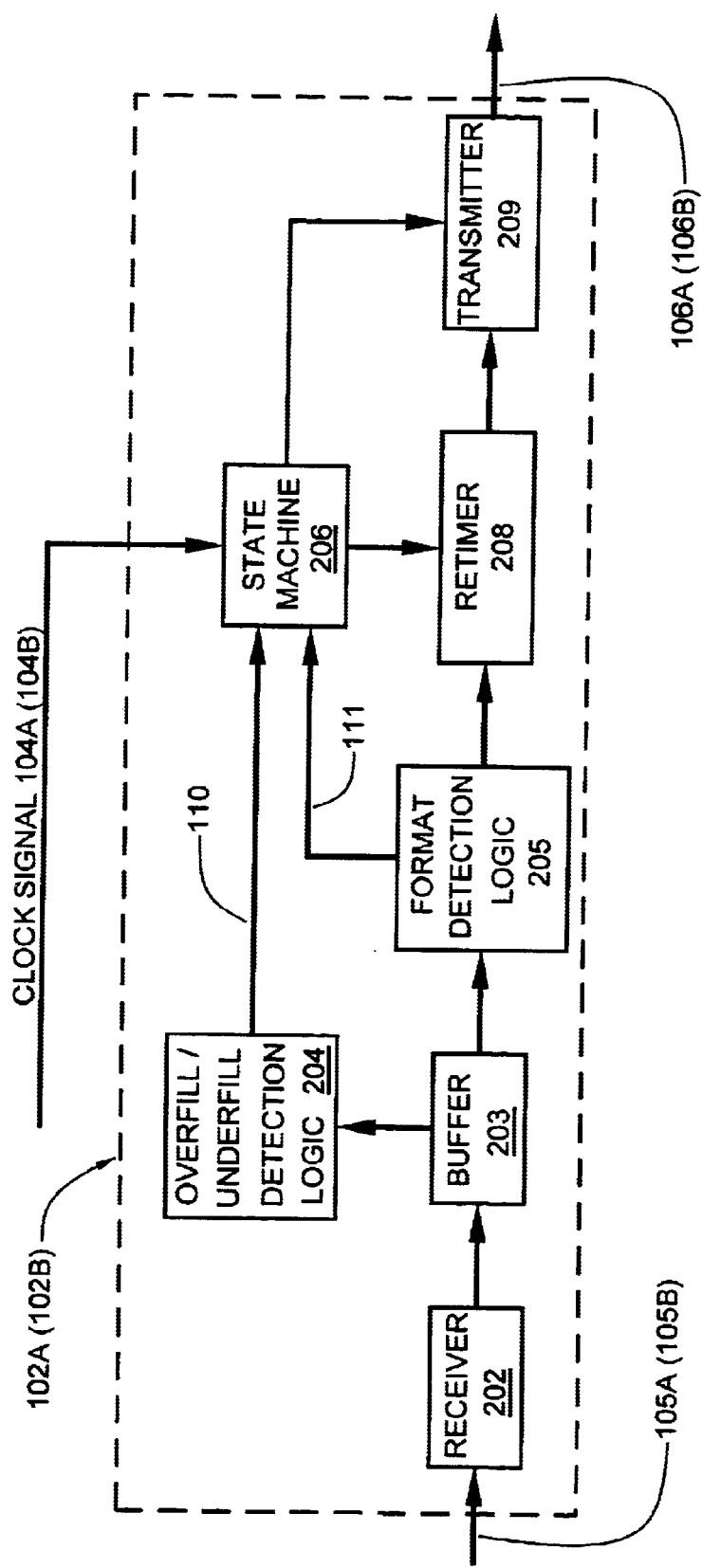
FIG. 2 is a block diagram of a synchronizer unit.

Referring now to FIG. 2, a synchronizer unit 102A or 102B includes a receiver 202 for receiving one of the serial input data streams 105A or 105B a buffer 203 for storing a sliding window of the received data stream 105A or 105B; overfill/underfill detection logic 204 for determining when the buffer is less than optimally filled and when it is more than optimally filled; format detection logic 205 for detecting start-of-frame (SOF) and end-of-frame (EOF) transmission words and fill words (FILL) between frames; a re-timer 208 for adding or deleting 40-bit fill words, as needed, between frames; a transmitter 209 for synchronizing and transmitting the reformatted resultant data stream 106A or 106B to the interleaver 103; and a state machine 206 for receiving either the 0°-phase signal 104A or the 180°-phase signal 104B from the local clock 101, signals from the overfill/underfill detection logic 204 and the format detection logic 205, and controlling the re-timer 208 and transmitter 209 in response to the received signals. Before any data is sent to the re-timer 208, the buffer 203, which is preferably of the first-in, first-out (FIFO) type, is allowed to partially fill. However, the buffer 203 is never allowed to fill completely, thereby providing slack for data streams of slightly mismatched frequency on either the high side or low side of the local clock frequency. The re-timer 208 maintains coarse synchronization with the local clock signal 104A or 104B by adding or deleting fill words from the data stream. The transmitter 209, which is controlled by the state machine 206, which is, in turn, controlled by the local clock signal 104A or 104B input thereto, is responsible for maintaining precise synchronization of the bits within the reformatted data stream.

Figure 3:
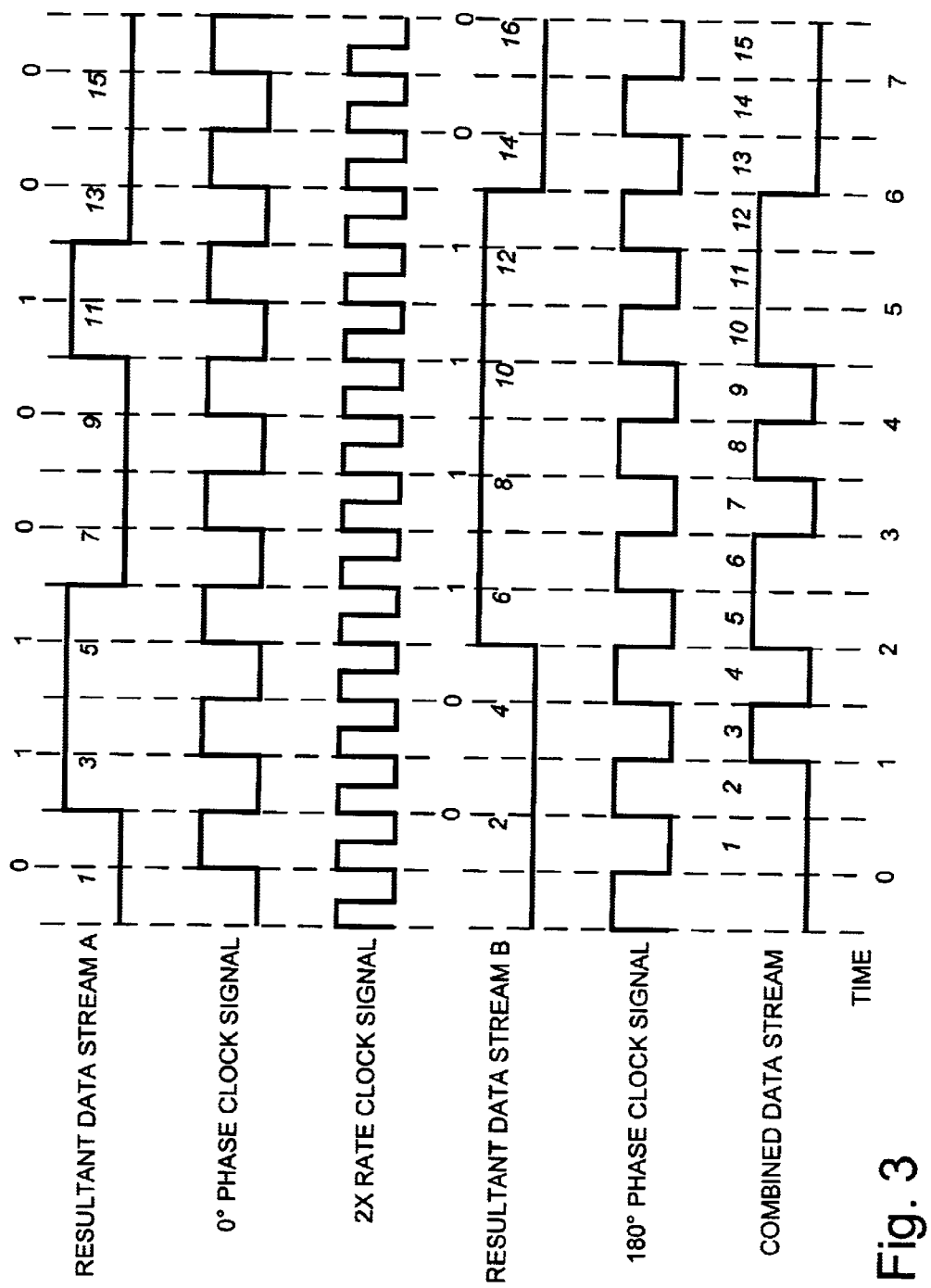
FIG. 3 is an interleaver timing diagram.

Referring now to FIG. 3, a timing diagram of the multiplexing process shows the bit patterns of a first input data stream A, of a second input data stream B, and of a resultant data stream; and the square-wave patterns of a zero-degree-phase clock signal, of a one-hundred-eighty-degree-phase clock signal, and of a 2× rate clock signal. Time, correlated with the zero-degree-phase clock signal, is designated by the integers 0 through 7 on the base line. A careful study of the timing diagram will shown that bits are taken alternately from the two reformatted data streams A and B, with the result that the combined data stream contains all of the bits from the reformatted resultant data streams A and B, with the odd-numbered bits coming from the reformatted B data stream and the even numbered bits coming from the reformatted A data stream.

Figure 4:
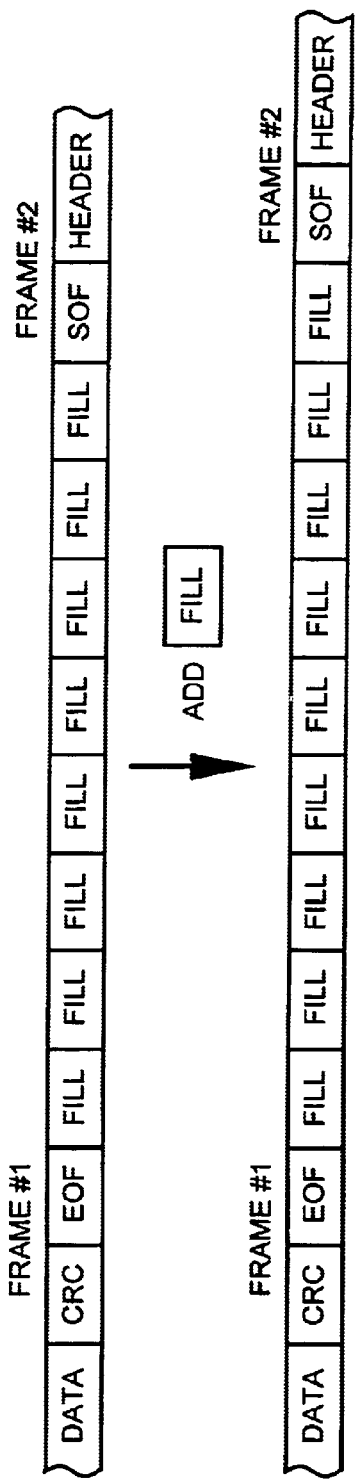
FIG. 4 is a sample data stream having two frames separated by eight fill words to which an additional fill word is added.
Figure 5:
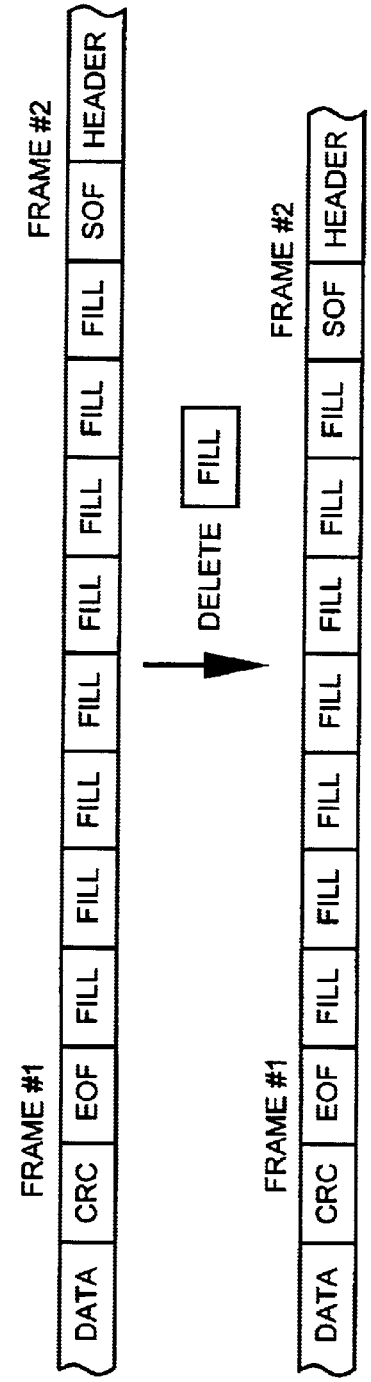
FIG. 5 is a sample data stream having two frames separated by eight fill words from which one of the fill words is deleted

FIGS. 4 and 5 begin with the same data stream sequence. The treatment of the sequence in FIG. 4 is the result of the data stream having a slightly slower baud rate than the local clock signal. The treatment of the sequence in FIG. 5 is the result of the data stream having a slightly faster baud rate than the local clock signal.

In FIG. 4, a final portion of a first frame (which includes data, crc, and end-of-frame sections) and a beginning portion of a second frame (which includes start-of-frame and header sections) are shown as being separated by 8 fill words. An additional fill word has been inserted between frames in order to make a coarse adjustment to the data flow. The reformatted stream has 9 fill words separating the first and the second frames. Some time is taken up by the transmission of the additional fill word, thereby allowing an increase in baud rate.

The identical starting sequence is used in FIG. 5. However, in this case, the baud rate of an incoming data stream is slightly faster than the frequency of the local clock signal. Therefore, it is necessary to periodically delete an excess fill word between frames. In this case, the reformatted resulting stream has 7 fill words separating the first and second frames. By deleting a surplus fill word, the baud rate is allowed to decrease.

In order to tag one of two combined bit streams, an easily-identifiable, special fill word having a pattern which does not occur in normal Fibre Channel traffic is substituted for an unnecessary fill word at the beginning of the stream, as well as periodically theraftter. Such a fill word is a 40-bit alternating k28.5 pattern (0011111101011000001010011111010110000101). Substitution of the alternating k28.5 fill word for an unnecessary fill word may be effected only when the unnecessary fill word occurs at least twice in a row.

Figure 6:
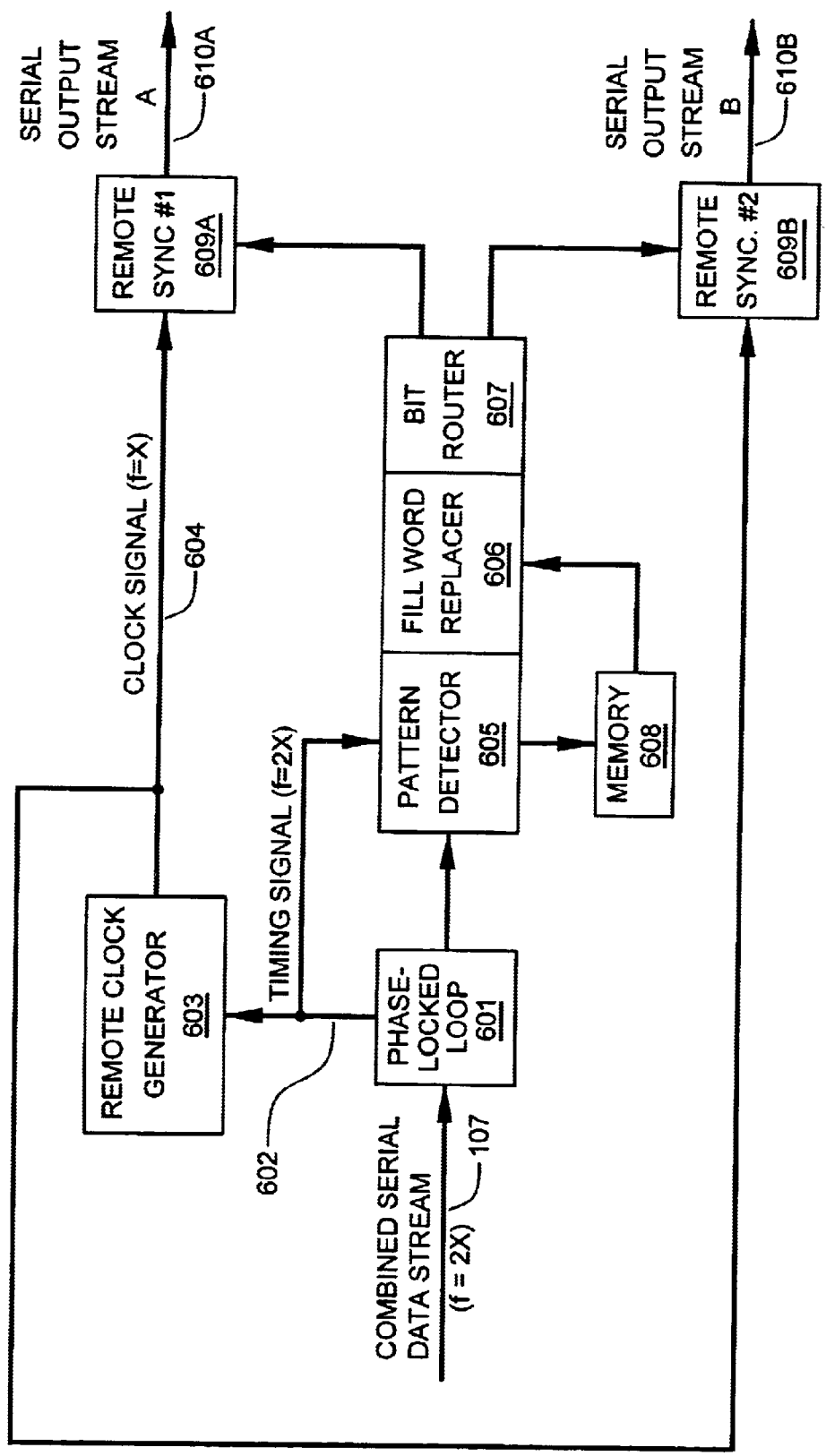
FIG. 6 is a block diagram of a double bitstream demultiplexer.

At the end of the link, it is necessary to separate the combined bit streams into separate bit streams. Referring now to FIG. 6, a phase-locked loop 601 is applied to the received serial data stream 107. The phase-locked rapidly synchronizes itself to the 2× frequency of the incoming data, producing a timing signal 602 that is equal to that frequency. The timing signal 602 is input to both a remote clock generator 603, which generates a 1× clock signal (i.e., half the frequency of the incoming data) 604, and a pattern detector 605. The pattern detector 605 is directly coupled to both a fill word replacer unit 606 and a bit router unit 607. The pattern detector 605 synchronizes itself to comma characters in the incoming data stream 107, and scans the data stream for fill words. The pattern detector 107 maintains the last received fill word in memory 608. When the alternating k28.5 pattern is detected (on alternating bits, of course), the fill word replacer 606 reads the contents of memory 608 and replaces the k28.5 pattern with another copy of the fill word that immediately preceded the pattern. The bit router 607 routes the bits which corresponded to the 28.5 pattern and all bits having the same phase relationship thereto to a first remote synchronizer 609A, which receives a 1× clock signal from the remote clock generator 603. The bits from the untagged stream are routed to a second remote synchronizer 609B which also receives the 1× clock signal from the remote clock generator 603. Serial output stream A (610A) and serial output stream B (610B) correspond to the original serial input stream A (105A) and serial input stream B (105B), respectively.

As can be readily appreciated from the foregoing disclosure, the multiplexing and demultiplexing methods, in combination with the disclosed hardware apparatus, is capable of providing rapid and reliable communications at double the baud rate of the incoming data streams, thereby increasing information throughput over a single channel.

Although only several single embodiments of the invention have been heretofore described, it will be obvious to those having ordinary skill in the art that changes and modifications may be made thereto without departing from the scope and the spirit of the invention as hereinafter claimed.

Figure 7:
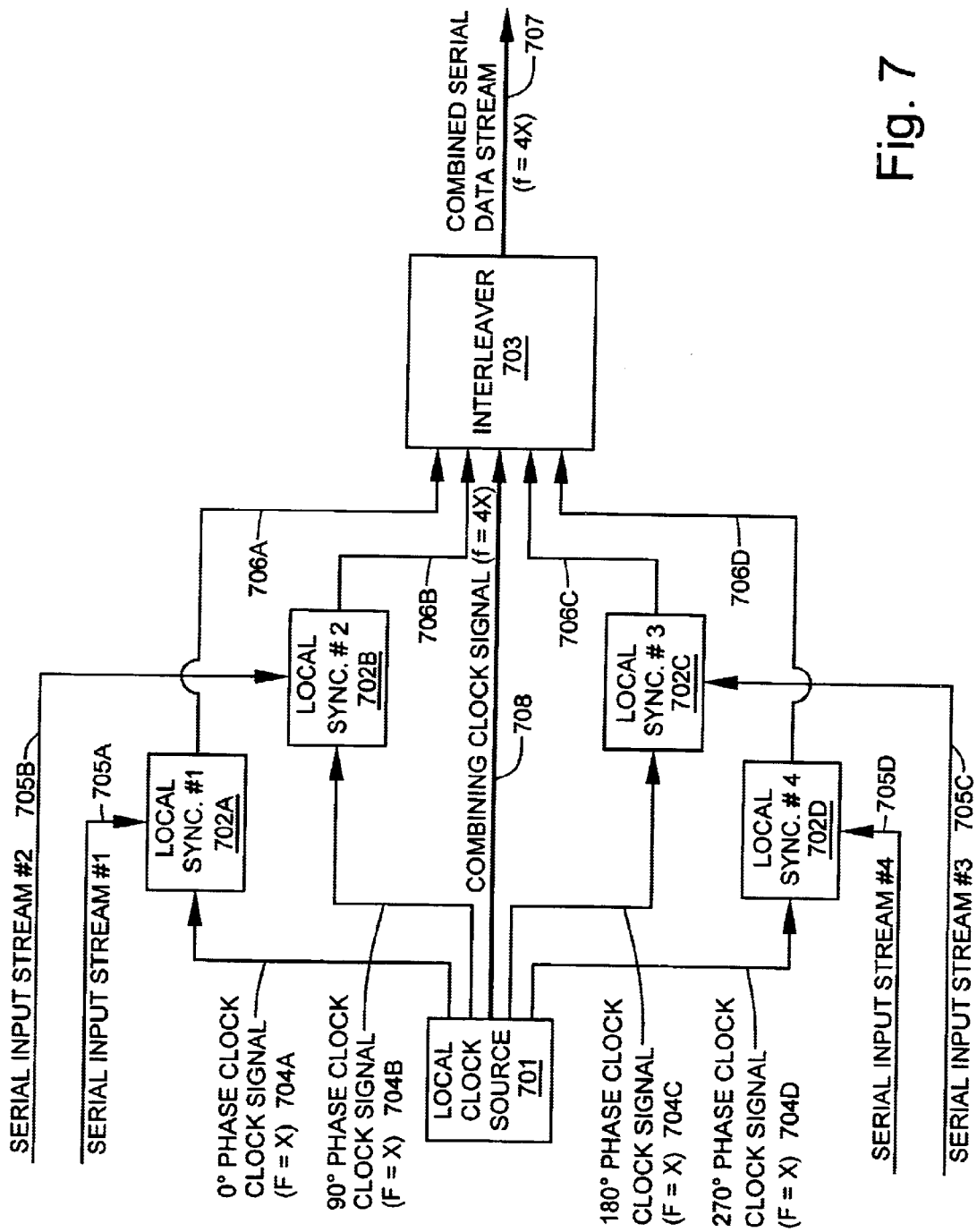
FIG. 7 is a block diagram of a quadruple bitstream multiplexer.

For example, although the invention has been disclosed in terms of combining a pair of serial data streams, the same technique can be employed to combine $2^n$ serial data streams, where n is an integer other than zero. FIG. 7 shows a block diagram of a quadruple bitstream multiplexer, where n=2. Little imagination should be required for implementations using larger values of n. In this particular case, instead [Instead] of generating a 0°-phase signal and a 180°-phase signal, the local clock source generates $2^n$, or 4, equally-spaced signals (704A, 704B, 704C and 704D), each of which is $360 degrees/2^n$, or 90 degrees, from an adjacent signal, and one of which is in a 0°-phase relationship with the fundamental frequency. A combining clock signal having a frequency of the fundamental frequency multiplied by $2^n$, or 4×, and which is in phase with each of the equally-spaced-apart clock signals, is also generated by the local clock source. Each of number of local synchronizer units (702A, 702B, 702O and 702C) receives a different incoming serial bitstream (705A, 7052, 7050 and 705D) and one of the equally-spaced apart clock signals, thereby outputting a retimed bitstream (706A, 706B, 706C and 706D, respectively) synchronized to the synchronizer unit's associated clock signal. The interleaver 703 then receives each of the $2^n$ reformatted bitstreams and combines them both into a single combined bitstream 707 having a baud rate equal to 4/X, which is the fundamental frequency X multiplied by $2^n$.

Likewise, though disclosed in the context of Fibre Channel operation, the invention may be applied to the multiplexing of any multiple pairs of serial data streams where the data may be retransmitted at a higher frequency to compensate for the additional information being sent over the single channel.

What is claimed is:

1. A method for combining first and second bitstreams, both of which have a nominal first baud rate and are organized as a sequence of frames containing data bits separated by fill words, into a third bitstream having a second baud rate, said method comprising:

providing a local clock source having a fundamental frequency that is nominally the same as the first baud rate, said local clock source generating a 0°-phase signal at the fundamental frequency, a 180°-phase signal at the fundamental frequency, and a double-frequency signal in phase with both the 0°-phase signal and the 180°-phase signal;

providing first and second synchronizer units, said first synchronizer unit for receiving said 0°-phase signal and said first bitstream, said second synchronizer unit for receiving said 180°-phase signal and said second bitstream, each synchronizer acting independently of the other to synchronize its received bitstream with its received signal by adjusting, as necessary, the fill word content of that bitstream's constituent frames; and providing an interleaver controlled by said double-frequency signal, said interleaver for receiving the synchronized first and second bitstreams and combining them both into a third bitstream containing all the data bits of said first and second bitstreams, and having a baud rate of double said fundamental frequency.

2. The method of claim 1, wherein bits are taken alternately from said first and second reformatted bitstreams by the interleaver.

3. The method of claim 2, wherein even numbered bits in the combined bit stream originate from one of the reformatted bit streams, while the odd numbered bits therein originate from the other reformatted bit stream.

4. The method of claim 1, which further comprises the steps of:

providing a buffer within each synchronizer unit;

storing a sliding window of bits contained within the incoming bit stream received by each synchronizer unit within that synchronizer unit's associated buffer, said sliding window contracting to an underfill limit if the baud rate of the associated incoming bit stream is slower than said fundamental frequency or expanding to an overfill limit if the baud rate of the associated incoming bit stream is faster than said fundamental frequency; and adding a fill word between frames whenever the underfill limit is reached; and deleting a fill word between frames whenever the overfill limit is reached.

5. The method of claim 4, which further comprises the step of providing a state machine for each synchronizer unit, said state machine controlling the addition and deletion of fill words.

6. The method of claim 5, which further comprises the step of providing underfill/underfill detection logic coupled to said state machine for detecting underfill and overfill conditions in said buffer.

7. The method of claim 1, which further comprises the step of tagging one of two combined bit streams by substituting a special fill word having a pattern which does not occur in normal Fibre Channel traffic for one of two consecutive unnecessary original fill words at the beginning of the stream, as well as periodically therafter.

8. The method of claim 7, wherein said special fill word is a 40-bit alternating k28.5 pattern.

9. The method of claim 7, which further comprises the process of demultiplexing the combined bit stream, said process comprising the steps of:

applying a phase-locked loop to the combined bit stream, thereby generating both a timing signal having a frequency equal to the baud rate of the combined bit stream;

generating an output clock signal having a frequency equal to one half the baud rate of the combined bit stream;

scanning the combined bit stream for the special fill word;

replacing the special fill word with the original fill word;

routing the replaced bits and all alternating bits in phase with the replaced bits to a first remote synchronizer timed by the output clock signal; and routing all other bits to a second remote synchronizer also timed by the output clock signal.

10. A data communications bitstream combiner for combining first and second serial bitstreams, both of which have a nominal first baud rate and are organized as a sequence of frames containing data bits separated by fill words, into a third bitstream having a second baud rate, said bitstream combiner comprising:

a local clock source having a fundamental frequency that is nominally the same as the first baud rate, said local clock source generating a 0°-phase signal at the fundamental frequency, a 180°-phase signal at the fundamental frequency, and a double-frequency signal in phase with both the 0°-phase signal and the 180°-phase signal;

first and second synchronizer units, said first synchronizer unit for receiving said 0°-phase signal and said first bitstream, said second bitstream, synchronizer unit for receiving said 180°-phase signal and said second each synchronizer acting independently to synchronize its received bitstream with its received signal by adjusting, as necessary, the fill word content of that bitstream's constituent frames; and an interleaver controlled by said double-frequency signal, said interleaver for receiving the synchronized first and second bitstreams and combining them both into a third bitstream containing all the data bits of said first and second bitstreams, and having having a baud rate of double said fundamental frequency.

11. The data communications bitstream combiner of claim 10, wherein all incoming bitstreams organized as frames containing data bits separated by fill words and wherein each synchronizer unit comprises:

a receiver for receiving one of the incoming serial bitstreams;

a buffer for storing a sliding window of the received bitstream;

overfill/underfill detection logic for determining when the buffer is less than optimally filled, and when it is more than optimally filled;

format detection logic for detecting frames and fill words between frames a re-timer which adds a fill word to the bitstream when the buffer is less than optimally filled and which deletes a fill word from the bitstream when the buffer is more than optimally filled;

a transmitter for synchronizing and transmitting the reformatted bitstream to the interleaver; and a state machine for controlling the re-timer and the transmitter in response to signals received from the local clock source, the overfill/underfill detection logic, and the format detection logic.

12. The data communications bit stream combiner of claim 11, wherein before any data is sent to the re-timer, the buffer is allowed to only partially fill, thereby providing elasticity to the received incoming bit stream, the baud rate of which may be slightly mismatched on either the high side or the low side of the fundamental frequency of the local clock source.

13. The data communications bit stream combiner of claim 11, wherein the re-timer maintains coarse synchronization with either the 0°-phase signal or the 180°-phase signal by adding or deleting fill words from the data stream.

14. The data communications bit stream combiner of claim 13, wherein the transmitter establishes precise synchronization with the local clock signal, whether it be the 0°-phase signal or the 180°-phase signal.

15. The data communications bitstream combiner of claim 11, wherein each pair of frames of the incoming serial bitstreams are separated by at least six fill words.

16. The data communications bit stream combiner of claim 11, wherein said buffer is of the first-in, first-out type.

17. The data communications bit stream combiner of claim 11, wherein one of the two combined bit streams is tagged by substituting a special fill word having a pattern which does not occur in normal Fibre Channel traffic for one of two consecutive unnecessary original fill words at the beginning of the stream, as well as periodically therafter.

18. The data communications bitstream combiner of claim 17, which further:

a phase-locked loop, which is applied to the combined bitstream, thereby generating both a timing signal having a frequency equal to the baud rate of the combined bitstream;

an output clock signal having a frequency equal to one half the baud rate of the combined bitstream;

first and second remote synchronizers timed by the output clock signal;

a pattern detector for scanning the combined bitstream for the special fill word;

a fill word replacer for replacing the special fill word with the original fill word;

a bit router for routing the replaced bits and all alternating bits in phase with the replaced bits to the first remote synchronizer; and routing all other bits to the second remote synchronizer.

19. A data communications bitstream combiner for combining $2^n$ number, n being an integer other than zero, of incoming serial bitstreams having the same nominal baud rate, into a combined bitstream having a second baud rate with a frequency that is about $2^n$ multiplied by said first baud rate, all incoming bitstreams organized as frames containing data bits separated by fill words, said bitstream combiner comprising:

a local clock source having a fundamental frequency that is nominally the same as the that of said first baud rate, said local clock source generating $2^n$ number of equally-spaced-apart, out-of phase clock signals, one of which is in a 0°-phase relationship with said fundamental frequency, and a combining signal having a frequency of the fundamental frequency mutliplied by $2^n$, said combining signal being in phase with each of the equally-spaced-apart clock signals;

$2^n$ number of synchronizer units, each synchronizer unit receiving a different incoming serial bitstream and one of said equally-spaced apart clock signals, each synchronizer acting independently to synchronize its received bitstream with its received signal by adjusting, as necessary, the fill word content of that bitstream's constituent frames; and an interleaver controlled by said combining signal, said interleaver receiving which receives each of the $2^n$ synchronized bitstreams and combines them both into a combined bitstream containing all the data bits of the incoming bitstreams, and having having a baud rate of said fundamental frequency multiplied by $2^n$.

20. The data communications bit stream combiner of claim 19, wherein each synchronizer unit comprises:

a receiver for receiving one of the incoming serial bit streams;

a buffer for storing a sliding window of the received bit stream;

overfill/underfill detection logic for determining when the buffer is less than optimally filled, and when it is more than optimally filled;

format detection logic for detecting frames and fill words between frames;

a re-timer which adds a fill word to the received bit stream when the buffer is less than optimally filled and which deletes a fill word from the received bit stream when the buffer is more than optimally filled;

a transmitter for synchronizing and transmitting the reformatted bit stream to the interleaver; and a state machine for controlling the re-timer and the transmitter in response to signals received from the local clock source, the overfill/underfill detection logic, and the format detection logic.

21. The data communications bit stream combiner of claim 19, wherein before any data is sent to the re-timer, the buffer is allowed to only partially fill, thereby providing elasticity to the received, incoming bit stream, the baud rate of which may be slightly mismatched on either the high side or the low side of the fundamental frequency of the local clock source.

22. The data communications bit stream combiner of claim 20, wherein the re-timer maintains coarse synchronization its associated clock signal by adding or deleting fill words from the data stream.

23. The data communications bit stream combiner of claim 22, wherein the transmitter establishes precise synchronization with its associated clock signal.

24. The data communications bit stream combiner of claim 19, wherein each pair of frames of the incoming serial bit streams are separated by at least six fill words.

25. The data communications bit stream combiner of claim 19, wherein said buffer is of the first-in, first-out type.

* * * * *